Feb. 20, 1934.    J. B. WHITTED    1,948,150
CLUTCH CONSTRUCTION
Filed May 9, 1932
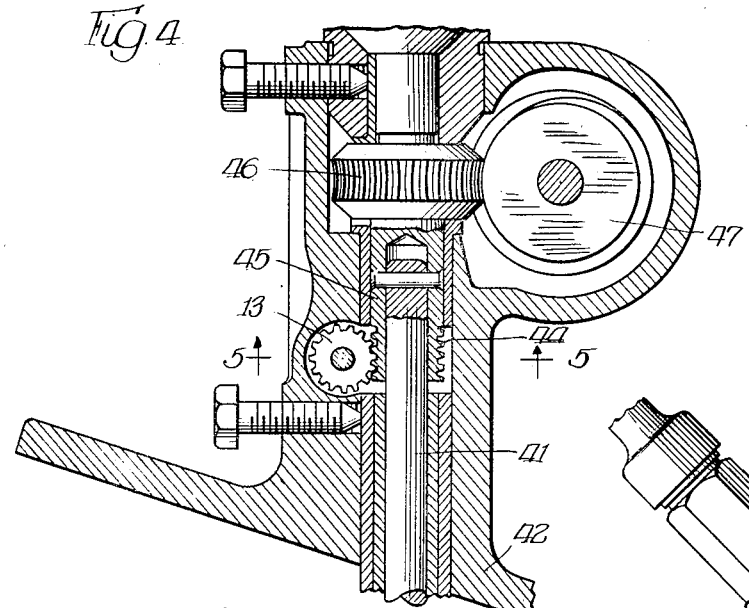
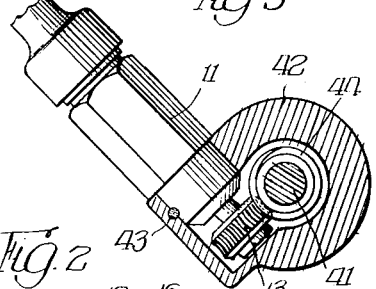
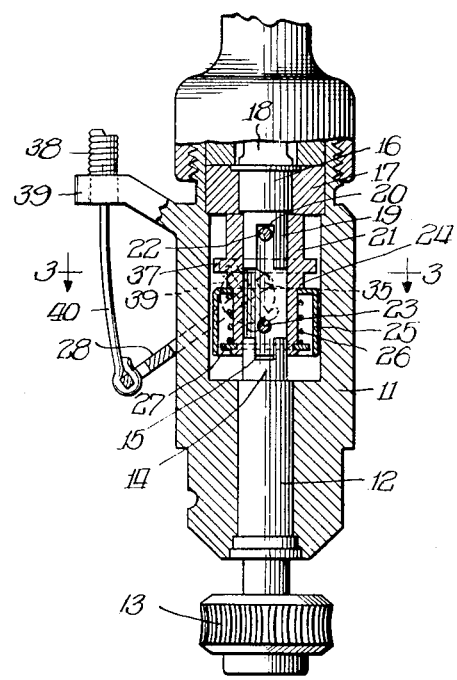
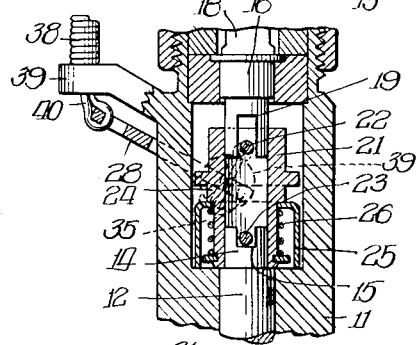
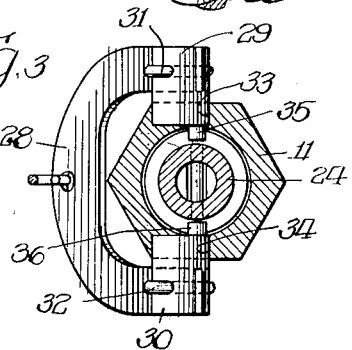
Inventor:
John B. Whitted Patented Feb. 20, 1934

1,948,150

UNITED STATES PATENT OFFICE 1,948,150

CLUTCH CONSTRUCTION

John B. Whitted, Chicago, Ill., assignor to Stewart-Warner Corporation, Chicago, Ill., a corporation of Virginia Application May 9, 1932. Serial No. 610,024

4 Claims. (Cl. 192—67)

This invention relates to a new and improved clutch construction, and more particularly to a positive type of clutch adapted for manufacture in small sizes.

While my improved clutch is adapted for use for a variety of purposes, it is especially adapted for use in connecting a flexible shaft or the like to a driving motor or other driving means. One specific use which may be mentioned is in connection with flexible drive shafts for mechanically operated windshield wipers for motor vehicles. The modern tendency in gasoline motor design is toward low suction in intake manifolds during normal operation. These low suctions render the use of suction operated wipers unreliable and uncertain in performance. With the use of mechanical wipers driven by flexible shafting from a rotating motor element it is desirable to provide a clutch adjacent the connection of the shafting to the motor so that the shafting will be rotated only when the wiper is in operation.

It is an object of the present invention to provide a new and improved clutch construction.

It is a further object to provide a clutch adapted to be made in small sizes and composed of but few and simple parts.

It is an additional object to provide a clutch adapted for operation from a distance by mechanical means.

It is also an object to provide a clutch adapted for commercial production at small cost.

Other and further objects will appear as the description proceeds.

I have shown a preferred embodiment of my invention in the accompanying drawing, in which—

Figure 1 is a view partly in section on an enlarged scale, showing the clutch assembly with the clutch disconnected;

Figure 2 is a fragmentary view similar to the clutch portion of Figure 1 showing the clutch in connected position;

Figure 3 is a section taken on line 3—3 of Figure 1;

Figure 4 is a view on a scale smaller than Figures 1, 2 and 3, showing one method of attachment of the clutch drive to a motor mechanism; and Figure 5 is a section taken on line 5—5 of Figure 4.

Referring first to Figures 1, 2 and 3, the housing 11 contains a driving shaft 12 which, as shown, is driven by the worm gear 13 which may be keyed or otherwise secured to the shaft. The free end of the shaft 12 is provided with a reduced portion 14 having a transverse recess 15. The driven shaft 16 has a bearing in the collar 17 carried by the upper end of the housing, and an upper extension 18 which may be connected in any desired manner to a flexible shaft or other drive connection. The lower end of the shaft 16 has a reduced portion 19 which has a transverse recess 20.

The clutch sleeve 21 is provided with the central bore fitting on the reduced portions 14 and 19 of the two shafts. This sleeve is provided with a transverse pin 22 adapted to fit in the recess 20 in the reduced end 19 of the driven shaft 16. The limits of movement of the sleeve 21 are such that the pin 22 will be at all times within the recess 20. The lower portion of the sleeve 21 is provided with a second cross pin 23 adapted to be moved in and out of the recess 15 in the reduced portion 14 of the driving shaft 12 within the limits of movement of the sleeve 21. The sleeve 21 is provided with a shoulder 24 adapted to engage a spring housing 25. The compression spring 26 is fitted within the housing 25 pressing against the housing at its upper end and against the flange 27 at its lower end. The housing 25 is slidably fitted upon the sleeve 21 while the flange 27 is rigidly secured to the sleeve.

The clutch actuating stirrup 28 has the cylindrical members 29 and 30 secured to its ends by cotter pins 31 and 32. These cylindrical members 29 and 30 fit within cylindrical recesses 33 and 34 formed in the housing 11. The members 29 and 30 are provided at their inner ends with the studs 35 and 36, which engage between the shoulder 37 on the sleeve 21 and the spring housing 25 slidably fitted on that sleeve.

A Bowden wire housing 38 has its end secured in an arm 39 extending from housing 11, and an actuating wire 40 extends through the housing 38 and is connected to the stirrup 28. This housing and clutch assembly may be fitted into a motor assembly at any desired point where a drive of proper speed may be had. It is shown in Figures 4 and 5 as connected to a timer drive shaft 41 carried in an engine housing 42. The clutch housing 11 is secured in place in the housing 42 by pin 43. The worm gear 13 is in mesh with the worm 44 formed in a sleeve 45 secured to the upper end of the drive shaft 41. This sleeve is shown as carrying a gear 46 in mesh with a second gear 47, but these parts have no bearing on the present invention and are merely conventional parts of an engine assembly.

In the operation of the clutch it will be understood that the driving shaft 12 will be rotating at all times when the engine with which it is associated is in operation. When the parts are in the position shown in Figure 1, the driven shaft 16 will be idle and no drive will be transmitted to the flexible shaft operating the windshield wiper or other mechanism for which the clutch is designed. In order to throw the clutch in operation it is necessary to pull on the Bowden wire which swings the stirrup 28 from the position shown in Figure 1 to the position shown in Figure 2. This movement of the stirrup causes the cylindrical members 29 and 30 to rotate about their axes and the studs 35 and 36 are given an arcuate movement pressing down against the sleeve 21 and moving it downwardly to the position shown in Figure 2. If the pin 23 is at this time in registration with the slot 15, it will immediately move to the position shown in Figure 2. If, however, the pin 23 is not in registration with the slot 15, it will rest upon the end of the reduced shaft portion 14 until that shaft has rotated to bring the slot in registration.

It will be apparent that the housing 25 is positively moved and the clutch sleeve 21 is moved by the compression spring 26. Consequently the spring 26 will be compressed when the member 25 is moved downwardly and this compressed spring will move the sleeve 21 as soon as the pin 23 registers with the slot 15. The clutch is disconnected by a thrust on the Bowden wire which moves the parts to the position shown in Figure 1. Since the pin 22 is always in the recess 20, the de-clutching movement may be made positively without the necessity of the interposition of any springs. It will be understood that the end of the Bowden wire adapted for manual operation may be located upon the instrument board of the motor vehicle or at any convenient point if the clutch is used in connection with a windshield wiper or the like.

While I have shown one preferred form of my invention and described one specific use therefor, these are to be understood to be illustrative only as the clutch may be modified to meet varying conditions and requirements and may be used for other purposes and I contemplate such changes and modifications as come within the spirit and scope of the appended claims.

I claim:

1. In a clutch construction, a housing, a driving shaft and a driven shaft having ends aligned in the housing, one of said shafts having a recess in its end, a sleeve slidably connecting the shafts, said sleeve having a pin adapted to make a driving engagement with said recess, and a driving connection between said sleeve and the other shaft and having an operating member pivotally supported in the housing.

2. In a clutch construction, a housing, a driving shaft and a driven shaft having ends aligned in the housing, a sleeve slidably fitted on said shafts, a permanent driving connection between said sleeve and one of said shafts, means carried by the sleeve for forming a detachable driving connection with the second shaft, a flange on said sleeve, a spring engaging said flange, and means for compressing said spring toward the flange to yieldingly move the sleeve toward said second shaft.

3. In a clutch construction, a housing, a driving shaft and a driven shaft having ends aligned in the housing, a sleeve slidably fitted on said shafts, a permanent driving connection between said sleeve and one of said shafts, means carried by the sleeve for forming a detachable driving connection with the second shaft, a flange on said sleeve, a spring engaging said flange, a housing for said spring slidably mounted on said sleeve, a shoulder on the sleeve adjacent the housing, and movable clutch operating means engaging the housing and shoulder to yieldingly move the sleeve in one direction and to positively move the sleeve in the other direction.

4. In a clutch construction, a housing, a driving shaft and a driven shaft having ends aligned in the housing, a sleeve slidably fitted on said shafts, a permanent driving connection between said sleeve and one of said shafts, means carried by the sleeve for forming a detachable driving connection with the second shaft, a flange on said sleeve, a spring engaging said flange, a housing for said spring slidably mounted on said sleeve, a shoulder on the sleeve adjacent the housing, and movable clutch operating means engaging the housing and shoulder to yieldingly move the sleeve in the direction to engage the driving connection with the second shaft and to positively move the sleeve in the opposite direction to disengage the connection.

JOHN B. WHITTED.